Nov. 15, 1960    L. D. CHRISTISON    2,960,358
HUB AND BUSHING ASSEMBLY
Filed March 6, 1958    2 Sheets-Sheet 1

INVENTOR:
Lewis D. Christison
By Smyth & Roston
Attorneys

Nov. 15, 1960 L. D. CHRISTISON 2,960,358
HUB AND BUSHING ASSEMBLY
Filed March 6, 1958 2 Sheets-Sheet 2

INVENTOR:
Lewis D. Christison
By Smyth & Roston
Attorneys

United States Patent Office 2,960,358
Patented Nov. 15, 1960

2,960,358

HUB AND BUSHING ASSEMBLY

Lewis D. Christison, 3691 Cedar Ave., Lynwood, Calif.

Filed Mar. 6, 1958, Ser. No. 719,556

3 Claims. (Cl. 287—52)

The present invention relates to conveyor pulleys and the like, and it relates more particularly to an improved hub and bushing assembly for mounting such pulleys on a supporting shaft. The invention provides an improved pulley which may be rigidly mounted on a rotatable supporting shaft in a relatively simple and straightforward manner.

Conveyor pulleys of the type with which the present invention is concerned usually comprise a cylindrical shell which is preferably made of steel. A pair of end disks are welded to the ends of the shell, and each of these disks constitutes a column connecting a central hub in each disk to the shell. It is obviously important that these end-disk columns be absolutely concentric with the axis of rotation of the pulley assembly and that they be free of stresses and axial or radial movement. These criteria are especially important in present day high speed conveyor belt installations in which any eccentricities in the pulley assemblies cause excessive vibration and wear to the belts and to other components of the overall system.

The present invention is more directly concerned with an improved hub and bushing assembly for the end disks of a pulley to mount such a pulley to a supporting shaft. The hub and bushing of the invention is so constituted, and the various components which make up the assembly cooperate with one another in such a manner, that a conveyor pulley utilizing the invention exhibits the desired characteristics outlined in the preceding paragraph. That is, the hub and bushing assembly of the invention is capable of efficiently mounting a pulley rigidly on a rotatable supporting shaft, and the mounting is such that the end disks of the pulley are in a stress-free condition and absolutely concentric with the axis of rotation of the shaft.

Although the hub and bushing assembly to be described finds probably its greatest utility in conjunction with conveyor pulleys and as a part of an overall conveyor pulley combination, it will be appreciated as the present description proceeds that the field of application of the hub and bushing assembly of the invention is not necessarily limited to conveyor pulleys. However, for the purposes of the present description, the assembly will be described in the environment of a conveyor pulley.

The assembly of the invention includes an annular hub which is adapted to be mounted in the central aperture of an end disk of a conveyor pulley and to be welded to the inner peripheral edge of the central aperture. It will be appreciated that each pulley will include two end disks, with a separate hub and bushing assembly for each disk.

A plurality of axially extending circular openings are provided through the hub at fixed angular positions around the hub. Each of these circular openings communicates along its length with the central opening of the hub. An annular split ring bushing is provided, and is intended to be clamped onto the supporting shaft. This bushing is adapted to be mounted in the hub in nested concentric relation with the hub, and it has axially tapered portions on its outer surface, these tapered portions being respectively adjacent to the circular openings through the hub. This bushing may have an axially extending keyway formed in it, and the keyway receives a key which is positioned in a corresponding axial keyway in the rotatable supporting shaft. Such a key and keyway may be used, for example, when the particular pulley is a drive pulley, rather than an idler. When such is the case, a driving force is transmitted from the shaft to a pulley which, under some circumstances, may necessitate the key and keyway arrangement.

Each of the circular openings in the hub receives a wedge member, and each of these wedge members has an axially tapered surface which engages the adjacent tapered portion of the bushing. A plurality of disk-like backing plates serve to prevent the wedge members and over respective ones of the circular openings. These backing plates serve to prevent the wedge members and the bushing from inadvertently falling out of the circular openings and into the inaccessible interior of the conveyor pulley while the assembly is being assembled.

Each of the wedge members has a threaded bore extending axially through it, and this bore is displaced from the central axis of the wedge in the direction away from its tapered surface. A corresponding screw is threaded into the bore during the assembling operations, and the head of the screw engages the outer end of the hub and of the bushing. Therefore, when the screw is tightened, the tapered surface of its associated wedge member is drawn forward on the adjacent tapered portion of the split bushing. This causes the bushing to be tightened securely down on the rotatable supporting shaft to rigidly mount the conveyor pulley on the shaft.

A feature of the assembly of the invention, as described above, is the provision of the wedge members with offset axial bores. The purpose for the offsetting of the bores is to move the screws outwardly from the surface of the bushing so as to permit full cylindrical screws to be used in conjunction with the respective wedge members without the screws interfering in any manner with the bushing as the assembly is tightened into place. Many prior art assemblies require screws or other threaded members having an axially tapered configuration, and this materially weakens these members. Since the screws are the main factor in setting up the clamping stresses in the bushing, it is of course most important that there be no impairment of their strength.

Another feature of the invention is the provision of the wedge members of the type described above having an axial length less than the axial length of the annular bushing. These wedge members are also shorter than the hub and they are completely contained within the circular openings in the hub. Therefore, when the wedge members are tightened into place they engage an intermediate axial portion of the bushing, rather than an end portion. This provides a strong clamping force on the bushing without distorting that member. Such distortion would occur if the force were imparted at one end of the bushing, rather than at its intermediate portion.

The provision of the disk-like backing plates for the circular openings, together with the provision of wedge members shorter than the hub and which, therefore, may be inserted completely in the openings, simplifies the assembling of the invention. These backing plates obviate any possibility for the wedge members to fall down into the interior of the pulley when the wedge members are inserted into the circular openings.

The hub and bushing of the invention produces sufficient clamping pressure by the bushing on the supporting shaft, due to the full cylindrical dimensions of the screws and due to the fact that the wedge members grip the bushing at an intermediate axial position on its peripheral surface so that no set screw is required to hold the above mentioned key between the bushing and the shaft in its respective keyways. The prior art units for the most part do require such a set screw, and the fact that the present invention obviates that necessity is a distinct advantage both from an economical and from a cost standpoint.

Further advantages and features of the invention will be evident from the following description, when the description is considered in conjunction with the accompanying drawings in which:

Figure 3b is an end view of the wedge member of Figure 3a taken from the right of Figure 3a;

Figure 4b is a side sectional view of the split ring bushing member of Figure 4a;

Figure 5A:
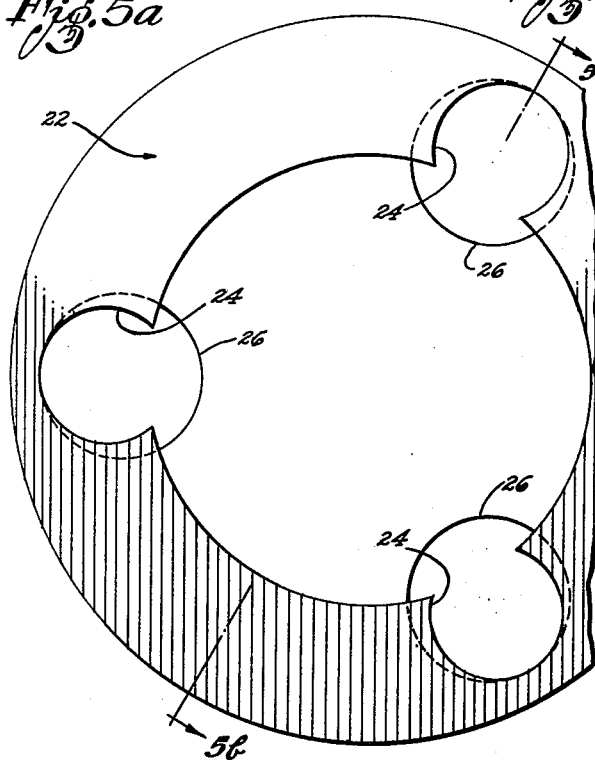
Figure 5B:
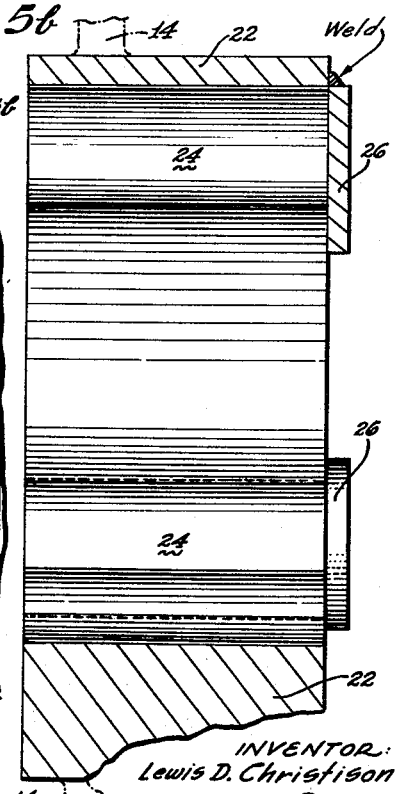

Figure 5a is an end view of a hub component of the assembly of the invention, this hub having a plurality of circular openings extending through it, each opening communicating along its axial length with the inner peripheral surface of the hub; and Figure 5b is a side sectional view of the hub of Figure 5a taken substantially on the line 5b—5b, this latter view showing a series of circular backing plates which are welded to the inner end of the hub to close the inner end of each of the circular openings in the hub so that the cylindrical wedge members and the bushing cannot fall through the openings and into the interior of the pulley during the assemblage of the unit.

Figure 1:
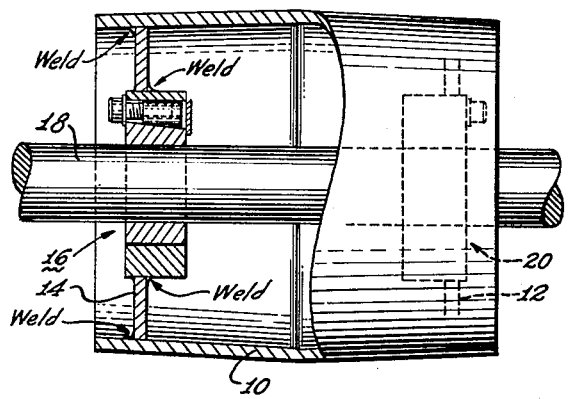
Figure 1 is a reduced scale, side elevational view (partially in section) of a conveyor pulley constructed in accordance with the invention, this view showing the details of the improved hub and bushing assembly of the invention which serves rigidly to clamp the conveyor pulley on a rotatable shaft.

The pulley assembly illustrated in Figure 1 of the drawings includes a cylindrical shell 10 which preferably is composed of mild steel, as noted above. A first end disk 12 is welded to one end of the cylindrical shell 10, and a second end disk 14 is welded to the other end of the shell. These disks also are preferably composed of mild steel. The disks 12 and 14 each have a central aperture, and a hub and bushing assembly 16 serves to clamp the end disk 14 on a rotatable supporting shaft 18, whereas a similar assembly 20 serves to clamp the end disk 12 on the supporting shaft. Since both the hub and bushing assemblies 16 and 20 may be similar in their construction, only the assembly 16 will be described in detail.

Figure 2:
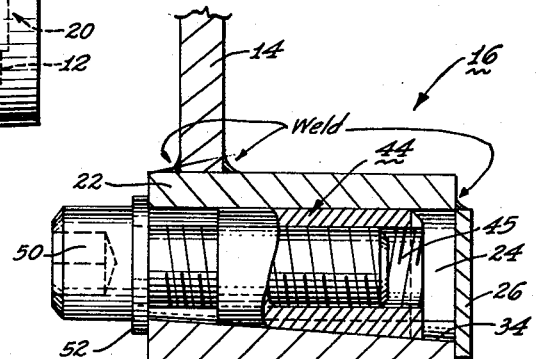
Figure 2 is an enlarged fragmentary side sectional view of the hub and bushing assembly of Figure 1, this latter view showing more clearly the various components which make up this assembly.

The hub and bushing assembly 16, as more clearly shown in Figure 2, includes an annular hub 22. This hub has an outer peripheral surface and an inner peripheral surface. The inner peripheral surface of the hub 22 has a slight taper, as shown, for example, in Figure 2. This taper facilitates the insertion of the bushing during the assemblage of the unit. The hub is welded to the end disk 14 at its outer peripheral surface, and it extends through the central aperture in the end disk.

As shown in Figure 5a, for example, the hub 22 has a group of three generally circular openings 24 extending axially through it from one end to the other. These openings are placed at fixed angular positions around the hub, and each opening communicates along its axial length with the inner peripheral surface of the hub 22. Three of such openings are shown in the illustrated embodiment of the invention, although more or less may be used when so desired. A plurality of disk-like circular backing plates 26 are welded to one end of the hub 22. Each of these backing plates covers the end of a different opening 24 and each backing plate extends into the central opening of the hub 22.

Figure 4A:
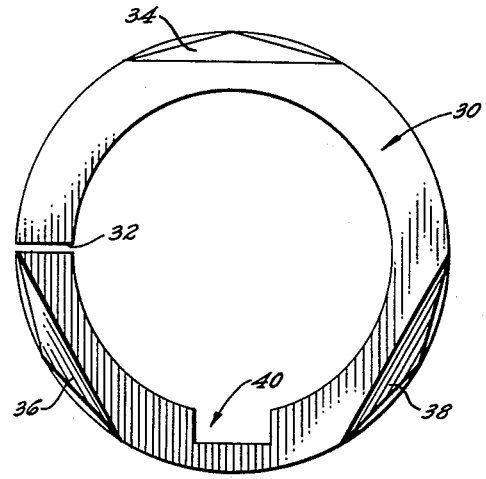
Figure 4a is an end view of a split annular bushing member which serves as a component of the assembly of the invention, this bushing having portions of its peripheral surface provided with a flat axially tapered configuration to receive in a complementary manner the tapered surfaces of the respective wedge members, as will be described.
Figure 4B:
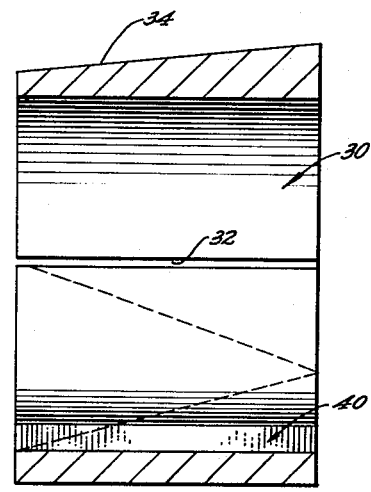

An annular bushing 30 is provided, and this bushing has a split 32 (Figures 4a and 4b) formed in it which extends along the axial length of the bushing and permits the bushing to be clamped down on the shaft 18. The bushing 30 is adapted to be fitted into the hub 22 back against the backing plates 26 in concentric relation with the hub. The backing plates preclude any possibility of the bushing slipping through the hub and slipping down into the interior of the pulley during assemblage of the unit.

Three portions of the outer peripheral surface of the bushing 30 at three different angular positions on the hub are provided with a flattened, axially tapered configuration. These portions are designated as 34, 36 and 38 in Figure 4a. These flattened tapered portions of the outer peripheral surface of the bushing 30 have angular positions which correspond with the angular positions of respective ones of the three circular openings 24 in the hub 22.

A keyway 40 may be formed in the inner surface of the bushing 30, and this keyway extends axially from one end of the bushing to the other. This bushing is intended to receive a key (not shown) which is also fitted in an axial keyway in the shaft 18 and which serves to key the pulley to the shaft. As noted, this key and keyway arrangement may be used in some applications of the unit.

In one constructed embodiment of the invention, the bushing 30 was provided with an outer diameter of 3.37 inches, and with an axial length of 2⅜ inches. The center lines of the tapered portions 34, 36 and 38 were displaced angularly by 120 degrees about the periphery of the bushing 30, and the axial tapered surface of each portion was provided with a 4° taper. The axial slot or split 32 of the bushing 30 in the constructed embodiment had a width of ¹⁄₁₆ inch. The hub 22 in the constructed embodiment had an outer diameter of 5⅝ inches, and a bore of 3.385 inches. The length of the hub in the constructed embodiment was 2⅜ inches, and the diameter of the circular openings 24 was 1¹⁄₆₄ inches. Each of the disk-like backing plates 26 was provided in the constructed embodiment with a diameter of 1¼ inches.

The hub and bushing, and in fact all the components of the pulley assembly, are preferably composed of mild steel. The above dimensions, and those which will be subsequently listed, are intended of course merely as a typical example. These dimensions are not to be construed as in any way limiting the invention.

Figure 3A:
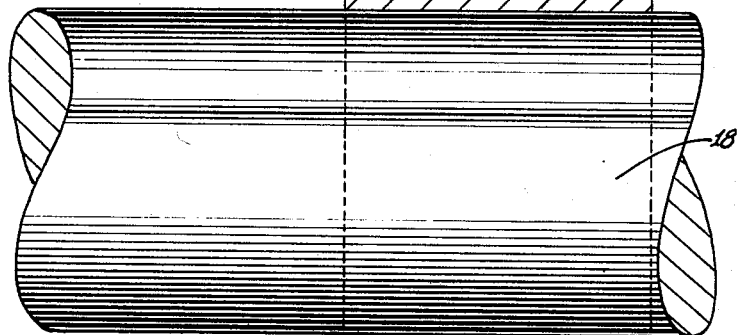
Figure 3a is a side sectional view of one of three wedge members which are used in the particular hub and bushing assembly of the invention which will be described.
Figure 3A:
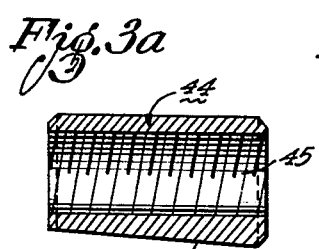
Figure 3B:
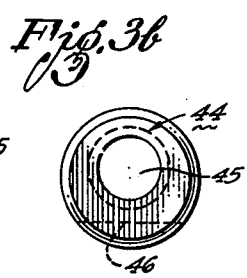
Figure 3C:
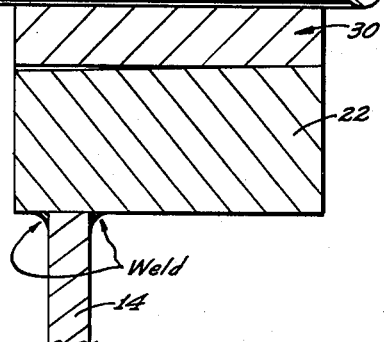
Figure 3c is an end view of the wedge member taken from the left in Figure 3a, these side and end views showing the manner in which a portion of the peripheral surface of the wedge member is provided with a flat axially tapered surface.
Figure 3C:
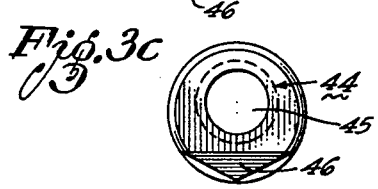

A plurality of wedge members, such as the wedge member 44 of Figures 3a, 3b and 3c, are provided, and each of these wedge members is adapted to be fitted into a corresponding one of the circular openings 24 in the hub 22. As mentioned previously, the disk-shaped backing plates 26 serve to assure that the cylindrical wedge members will fall through the openings and into the interior of the conveyor pulley.

The wedges 44 each have a length which is less than the axial length of the hub 22 and of the bushing 30. Each of these wedge members, as shown, for example, in Figures 1 and 2, may therefore be supported entirely within its corresponding opening 24 to engage the peripheral surface of the bushing 30 at a position intermediate the ends of the bushing. Each of the wedge members 44 is provided with an axial flat tapered surface 46 (Figures 3a, 3b and 3c) which serves to complement the corresponding one of the tapered surfaces of the portions 34, 36 and 38 of the bushing 30. When each wedge member 44 is in place in its corresponding circular opening 24, the flat tapered surface of the respective wedge members engages the corresponding one of the flat tapered surfaces 34, 36 and 38 of the bushing through the axial communicating portions of the circular openings.

Each of the wedge members 44 has a threaded bore 45 extending axially through it. The central longitudinal axis of this bore is displaced from the central axis of the wedge member in a direction away from the flat axially tapered surface 46 of the wedge. A screw, such as the screw 50 (Figure 2) is threaded into the bore 45 of each wedge member 44, and due to the fact that the central axis of the bore is displaced outwardly in the radial direction from the tapered edge 46 of the wedge and from the corresponding tapered portion of the bushing, the screw can have a full cylindrical configuration and still clear the bushing 34. That is, the offset bores 45 displace the screws 50 radially outwardly from the outer periphery of the bushing 30. This permits each screw 50 to have a full circular cross section without interfering in any way with the bushing.

The head of each of the screws, such as the screw 50, engages the outer end of the hub 22 and the outer end of the bushing 34, as shown in Figure 2, for example. As the screw 50 is tightened, it serves to draw the corresponding wedge member 44 to the left in Figure 2 to tighten the bushing 30 into clamped engagement with the shaft 18. This clamping action is due to the complementary engagement of the flattened tapered surface of each of the wedge members 44 with the corresponding complementary tapered surface of the portions 34, 36 and 38 of the bushing 30, as each of the screws 50 associated with the different wedge members is tightened.

It will be evident that each screw 50 is tightened to clamp the bushing 30 down on the shaft 18, no stress is set up in the end disk 14. This is most important, for the reasons described above, since it is essential that the end disks of the pulley be stress-free and be free from any extraneous movement. Also, due to the fact that the wedges 44 are completely contained within the openings 24 and have a length less than the axial length of the hub 22 and of the bushing 30, the tightening of the screws 50 causes each wedge to engage the periphery of the bushing 30 at a portion of the bushing intermediate its ends rather than at its ends, so that there is no end distortion in the bushing as it is clamped in place and so that a full and efficient clamping force can be exerted against the bushing and by it against the shaft 18. Also, due to the fact that the screws, such as the screw 50, are displaced from the central axis of their corresponding wedge members 44, they may, as noted above, have a full circular cross section so that they may exert a maximum force on the wedge 30. This is an advantage over prior art assemblies of the same general type which include threaded studs corresponding to the screws 50. These studs in most prior art assemblies required a tapered configuration to clear the periphery of the bushing 30 and, therefore, were incapable of exerting a maximum clamping force on the bushing.

In the constructed embodiment of the invention referred to above, the wedge members 44 each had a length of 1 11/16 inches, and their flattened portions were provided with a 4° slope. Also, the outer diameter of each of the wedge members was of the order of 1 inch in the constructed embodiment of the invention. The screw 50 may, for example, be a 5/8–11 socket-head cap-screw, and a lock washer 52 may be interposed between the head of this screw and the end of the bushing 30 and the end of the hub 22. To lock the conveyor pulley on the rotable shaft 18, it is merely necessary to slip the cylinder 10, with its end disks 12 and 14 and its hubs, such as the hub 22, over the shaft 18. A cylindrical wedge member, such as the member 44 is then inserted into each of the circular openings 24, with its flat tapered surface facing the portion of each opening which communicates with the inner peripheral surface of each hub. Then the bushings, such as the bushing 30, are inserted around the shaft and in the hub. Appropriate keys are inserted in the keyway 40 in each bushing and in a corresponding keyway in the shaft 18. Then the screws, such as the screw 50, are threaded into the bores of the wedge members, such as the member 44. As these screws are tightened, the corresponding wedge members are drawn along the tapered portions 34, 36 and 38 of the bushing 30 to tighten the bushing into a clamped relation with the shaft 18. It should be noted that during these operations there is no axial movement of the bushing 30, and there is no tendency to set up undesired stresses in either the end disk 14 or in the end disk 12.

The fact that the wedge members 44 engage the bushing 30 at positions intermediate the axial ends of the bushing, and the fact that the radial displacement of the screws 50 outwardly from the bushing 30 to permit a full circular cross section for these screws, provides a damping pressure by the bushing 30 on the shaft 18 which exceeds the pressure provided by prior art units of this general type. It has been found that a sufficient clamping pressure is provided for all practical purposes without the need for excessively large components, and that the clamping pressure is adequate so that no set screw is required to maintain the key referred to above in its keyways.

The slight taper of the inner peripheral surface of the hub 22, as noted above and as shown in Figure 2, permits the bushing 30 to be easily moved over the shaft and into the hub back against the backing plates 26 without the need for any excessive force even if the shaft is slightly oversize. Therefore, before the wedges 44 are tightened, the bushing may be moved securely back into position in the hub. This assures that there will be no axial movement of the bushing during the tightening of the wedges, and this eliminates as noted any tendency to set up any unwanted stresses or strains in the end discs 14.

As mentioned above, a keyway 40 and corresponding key may be used in some applications in each of the pair of hub and bushing assemblies included in conveyor pulleys constructed in accordance with the invention. When such keys and keyways are used, the present invention is advantageous in that no critical alignment problems arise with respect to the keyways on the hub and bushing assemblies at each end of the conveyor pulley in question. This follows because the construction of the invention permits the individual bushings to be rotated slightly with respect to the hubs, the cylindrical wedges being rotated accordingly. This permits a slight misalignment between the keyway in the hub and bushing assembly at one end of the conveyor pulley and the keyway in the hub and bushing assembly at the other end of the conveyor pulley. Then each bushing may be individually rotated a slight amount with respect to its hub to bring its keyway into alignment with the keyway on the shaft.

I claim:

1. A hub assembly including: an annular hub having an inner peripheral surface defining a bore therein and having at least one axially extending opening therein adjacent the bore and intersecting said inner peripheral surface along at least a portion of its length, a backing plate affixed to one end of the hub to cover at least a portion of the axial opening therein, an annular split bushing fitted in nested concentric relationship with the hub and having an outer peripheral surface with at least a portion of that surface having an axially tapered configuration extending lengthwise of the bushing, an elongated wedge member fitted in the axial opening in the hub, said wedge member having a length less than the axial length of the bushing and having an axially tapered surface extending lengthwise of the wedge for engaging the axially tapered surface of the bushing through the portion of said opening which intersects with said inner peripheral surface of the annular hub, said wedge member further having a threaded bore extending axially therein along an axis parallel to the central axis thereof but displaced therefrom in a direction away from the tapered surface thereof, a cylindrical screw having a full circular cross-section threaded into the bore of the wedge, and means at one end of the screw for engaging an end of the hub and an end of the bushing to cause the wedge to be moved with respect to the hub and the bushing as the screw is tightened with the axially tapered surface of the wedge engaging the axially tapered surface of the bushing so as to force the bushing into a clamping condition.

2. A hub assembly including: an annular hub having an inner peripheral surface defining a bore therein and having at least one axial opening extending therethrough adjacent the bore and intersecting said inner peripheral surface along its axial length, a backing plate affixed to an end of the hub and covering at least a portion of one end of the axial opening and extending radially beyond the inner peripheral surface of the hub, an annular split bushing fitted in nested concentric relationship with the hub and having an outer peripheral surface with at least a portion of that surface having an axially tapered configuration extending from one end of the bushing to the other, said backing plate limiting the axial movement of the bushing in the hub with respect to the hub, an elongated wedge member fitted into the axial opening in the hub and having a length less than the axial length of the bushing and having an axially tapered surface extending from one end of the wedge to the other for engaging the tapered surface of the bushing through the portion of said opening which intersects with said inner peripheral surface of the annular hub, the wedge member having a threaded bore extending axially therein along an axis parallel to the central axis of the wedge but displaced therefrom in a direction away from the tapered surface of the wedge, and a cylindrical screw having a full circular cross-section threaded into the bore of the wedge and having a head for engaging the other end of the hub and an edge of the bushing for axially moving the wedge member in the opening and for forcing the tapered surface of the wedge against the tapered surface of the bushing as the screw is tightened to force the bushing into a clamping condition, said bushing and said wedge being capable of limited rotative adjustment with respect to the hub.

3. The combination defined in claim 2 in which said inner peripheral surface of the hub has a tapered configuration to facilitate the insertion of the bushing therein.

References Cited in the file of this patent

UNITED STATES PATENTS

| | | |
|---|---|---|
| 62,081 | Smith | Feb. 12, 1867 |
| 223,335 | Geisinger | Jan. 6, 1880 |
| 525,775 | Wainwright | Sept. 11, 1894 |
| 625,948 | Bickel | May 30, 1899 |
| 1,393,064 | Woodward | Oct. 11, 1921 |
| 1,629,113 | Maier | May 17, 1927 |
| 2,612,395 | Russell | Sept. 30, 1952 |

FOREIGN PATENTS

| | | |
|---|---|---|
| 25,403 | Germany | Dec. 29, 1883 |